(12) United States Patent
Payne

(10) Patent No.: US 8,342,200 B1
(45) Date of Patent: Jan. 1, 2013

(54) METER YOKE VISE

(76) Inventor: William Payne, Woodlawn, TN (US)

( * ) Notice: Subject to any disclaimer, the term of this patent is extended or adjusted under 35 U.S.C. 154(b) by 134 days.

(21) Appl. No.: 12/804,400

(22) Filed: Jul. 20, 2010

(51) Int. Cl.
*F16L 55/18* (2006.01)

(52) U.S. Cl. ............... 137/315.06; 137/15.03; 29/281.1; 269/95

(58) Field of Classification Search ............ 269/86, 269/3, 6, 95, 55, 71; 29/281.1, 255; 137/15.03, 137/315.06
See application file for complete search history.

(56) References Cited

U.S. PATENT DOCUMENTS

| | | | | |
|---|---|---|---|---|
| 308,051 | A * | 11/1884 | Bixby | 254/232 |
| 943,330 | A * | 12/1909 | Yearke | 285/30 |
| 996,244 | A * | 6/1911 | Hess | 269/204 |
| 3,338,086 | A * | 8/1967 | Hunter | 72/457 |
| 3,982,740 | A * | 9/1976 | Gutman | 269/110 |
| 4,278,246 | A * | 7/1981 | Blake | 269/220 |
| 4,327,760 | A * | 5/1982 | Lancaster | 137/15.03 |
| 2008/0135106 | A1* | 6/2008 | Germata et al. | 137/315.06 |

* cited by examiner

*Primary Examiner* — Joseph J Hail
*Assistant Examiner* — Joel Crandall
(74) *Attorney, Agent, or Firm* — Richard K Thomson

(57) ABSTRACT

The present invention comprises a yoke vise that can be secured to the inflow/outflow plumbing to a water meter, facilitating the removal or replacement of the meter and shut-off valve without damage to the plumbing.

13 Claims, 5 Drawing Sheets

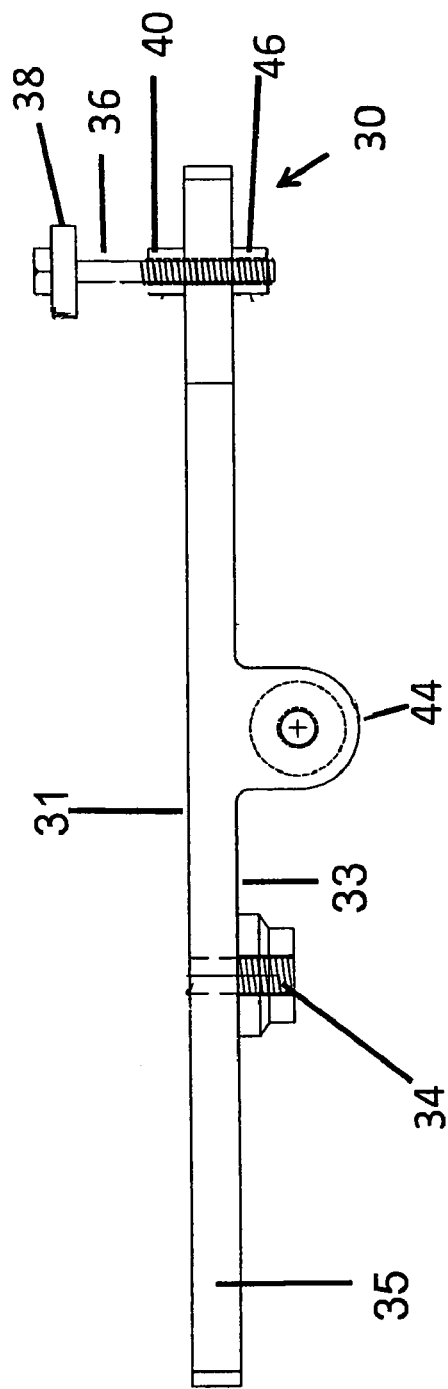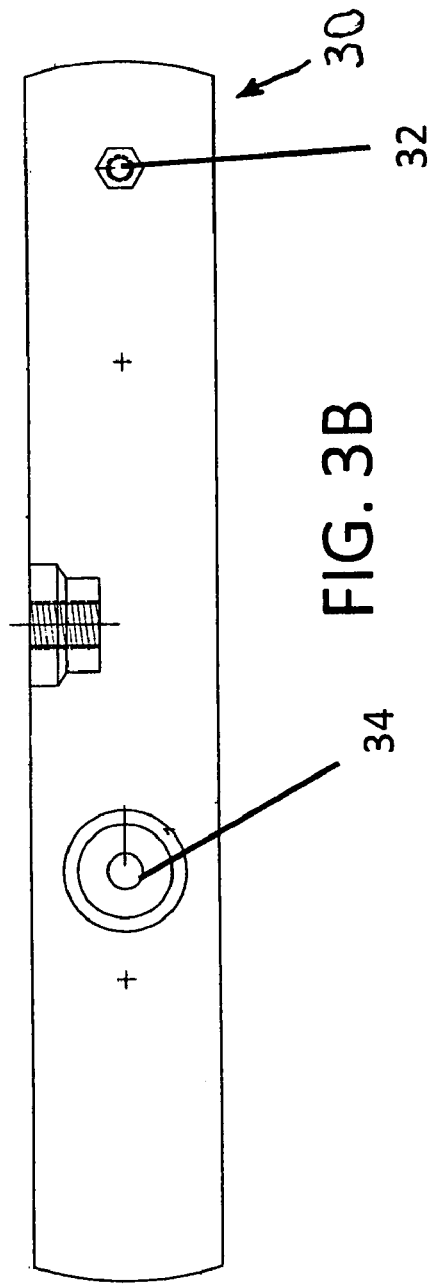
FIG. 3A
FIG. 3B

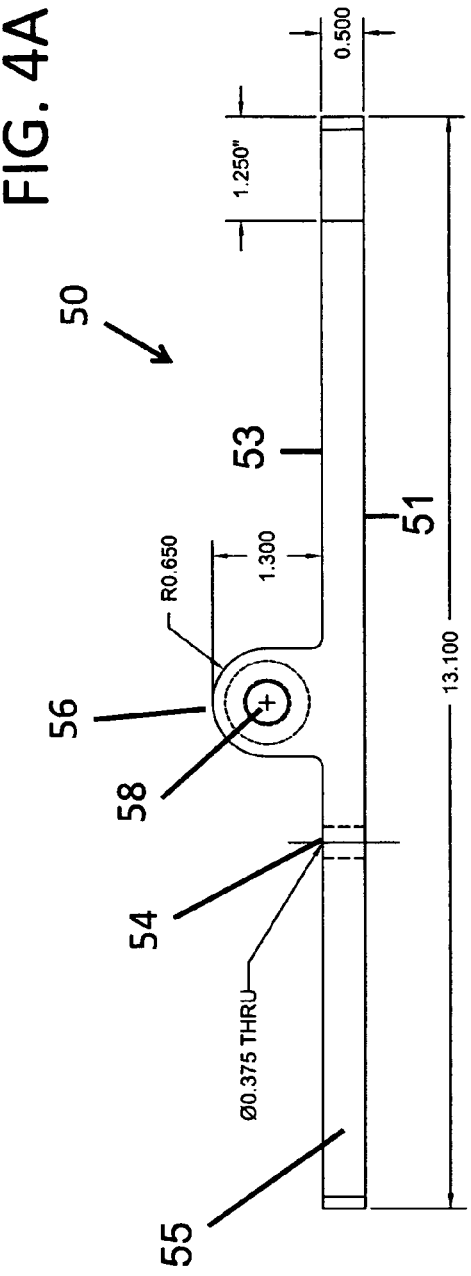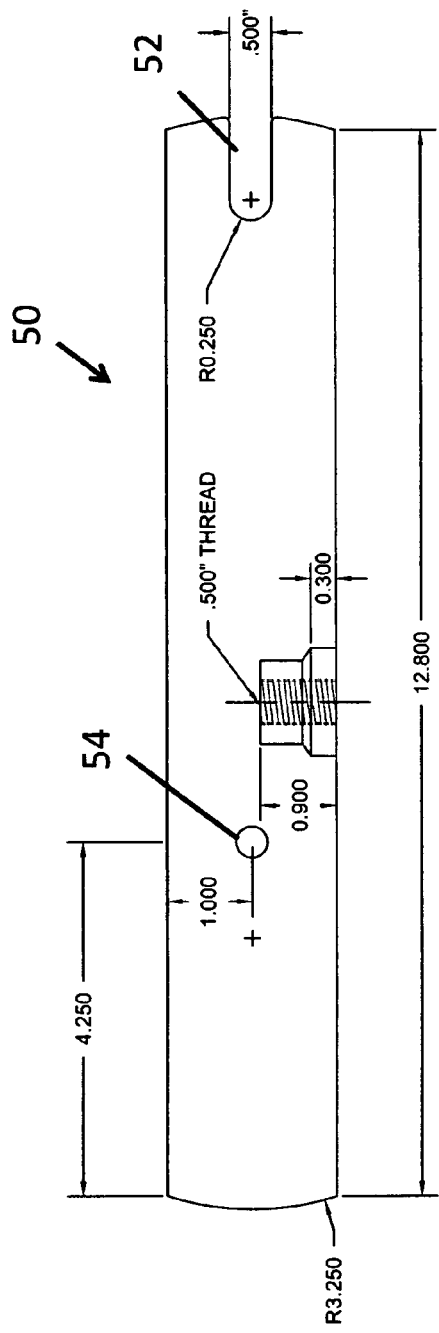

METER YOKE VISE

BACKGROUND AND SUMMARY OF THE INVENTION

This invention relates generally to plumbers' tools and more specifically to devices for installing and uninstalling water meters, shutoff valves, and other plumbing parts associated with water meters.

Installing and uninstalling water meters is a common task in plumbing. After many years of use, the meters often need to be removed, fixed, and reinstalled. In other cases, a water company will issue a new water meter model to replace a group of water meters. In addition, the shutoff valve, which is usually made of a soft metal such as copper or brass, has parts such as ears that are susceptible to fast wearing thus requiring replacement of the entire shutoff valve.

Replacing a water meter or shutoff valve requires a great deal of care and delicacy. The connecting pipes are typically made of copper or other soft metal that are susceptible to bending, breaking, and kinking which cannot be fixed without replacing the pipes. It may also be impossible to remove or tighten connecting threads without adding makeshift braces and levers because the pipes have insufficient stabilizing support to prevent damage from torque, pushing, and pulling during the removal or replacement of the meter or shutoff valve.

To remove or install a water meter or shutoff valve, the standard procedure is to reach into the well holding the meter and add boards for bracing and additional wrenches and screwdrivers as counter-levers to the threads being loosened or tightened. Even for a professional plumber, however, the additional wrenches and screwdrivers often jostle out of place, causing the task to take longer and risking damage to the pipes.

It would be advantageous to develop a meter yoke vise, thereby bracing and stabilizing the plumbing so that the water meter and shutoff valve can be removed or installed with little or no pressure or torque on the connecting pipes.

The problem of holding surrounding plumbing in place during removal and installation of water meters and shutoff valves is solved by putting in place a meter yoke vise that is designed to take advantage the structure of a water meter and surrounding plumbing, and can be quickly and easily put in place and removed.

In the displayed embodiment, the meter yoke vise comprises: a) a right bracket; b) a left bracket; c) two mechanisms to connect the right and left bracket; c) a wrench; and d) a tension knob that secures the wrench to the brackets.

The distance measurements labeled in some of the figures are simply for the purpose of assisting others in reproducing this particular embodiment and are not meant to limit the scope of applicant's invention.

Various other features, advantages and characteristics of the present invention will become apparent to one of ordinary skill in the art after a reading of the following specification.

BRIEF DESCRIPTION OF THE DRAWINGS

An embodiment of the present invention is described in conjunction with the associated drawings in which like features are indicated with like reference numerals and in which

FIG. 3A is a top view of the right bracket of the first embodiment;

FIG. 3B is a side view of the right bracket of the first embodiment;

FIG. 4A is a top view of the left bracket of the first embodiment;

FIG. 4B is a side view of the left bracket of the first embodiment; and

DRAWING REFERENCE NUMERALS

Figure 1:
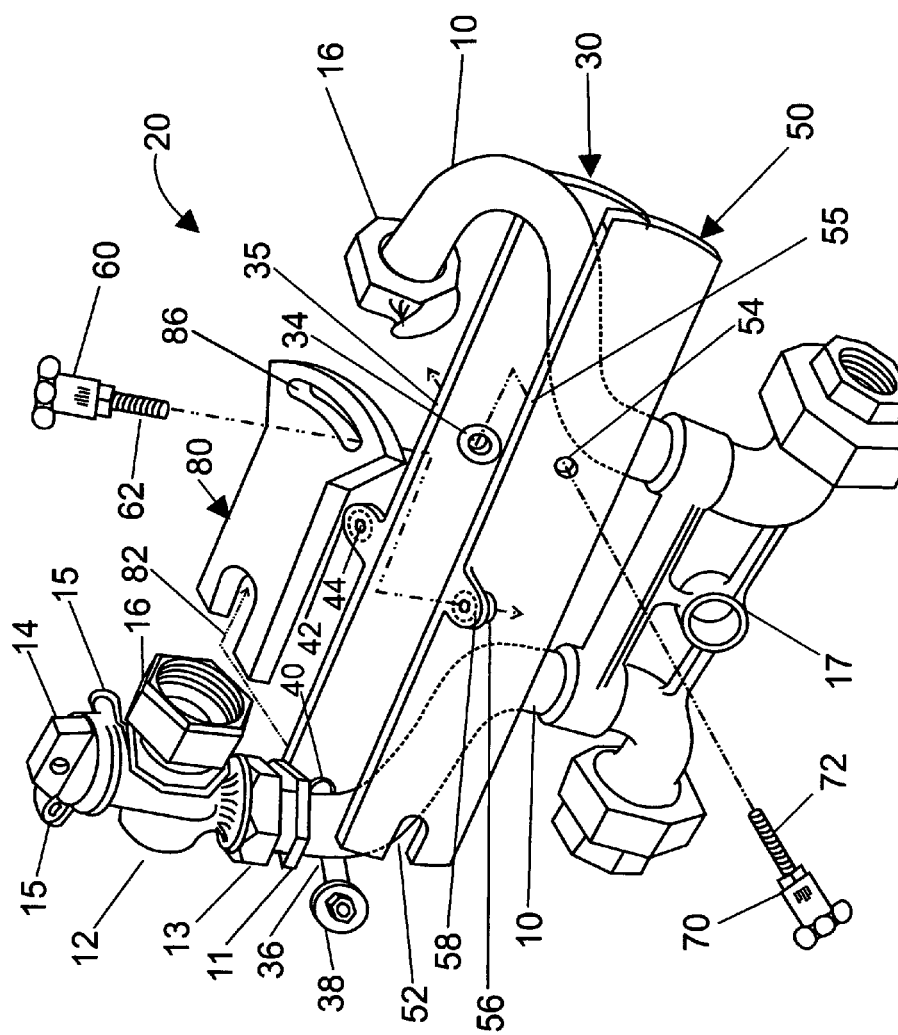
FIG. 1 is a top perspective pre-assembly view of a first embodiment of the yoke vise of the invention.

Water pipes 10
Male adapter 11
Shutoff valve 12
Shutoff female nut 13
Shutoff handle 14
Shutoff valve ears 15
Slip nuts 16
Permanent yoke 17
Yoke vise 20
Right bracket 30
Right bracket inside wall 31
Right bracket bolt aperture 32
Right bracket outside wall 33
Right bracket connector aperture 34
Right bracket top edge 35
Bolt 36
Washer 38
Right bracket inside nut 40
Right bracket protrusion 42
Right bracket protrusion aperture 44
Right bracket lock nut 46
Left bracket 50
Left bracket inside wall 51
Left bracket open-end slot 52
Left bracket outside wall 53
Left bracket connector aperture 54
Left bracket top edge 55
Left bracket protrusion 56
Left bracket protrusion aperture 58
Tension knob 60
Tension knob threads 62
Connector knob 70
Wrench 80
Wrench open-end slot 82
Wrench finger holes 84
Wrench arc slot 86

DESCRIPTION OF EMBODIMENT

Figure 2:
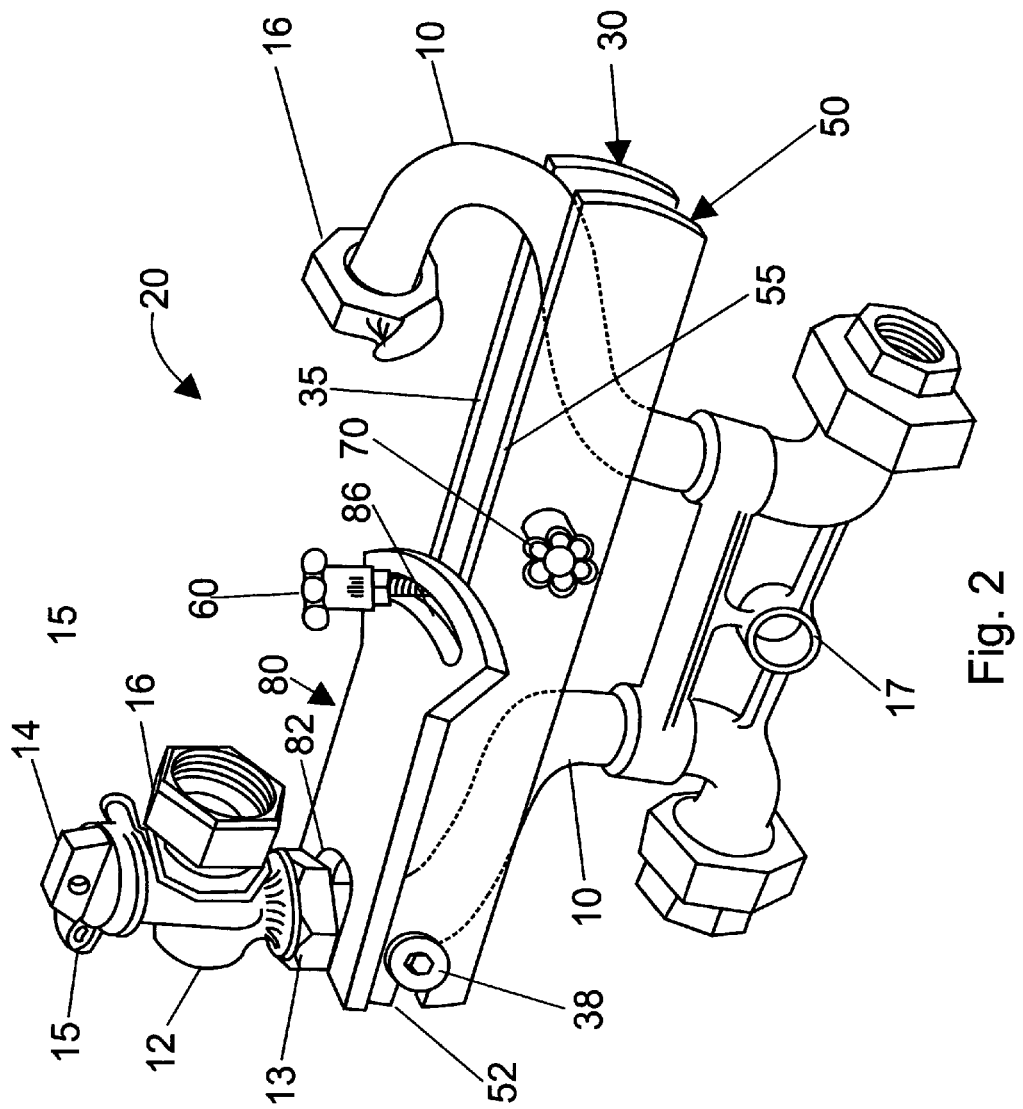
FIG. 2 is a top perspective post-assembly view of the first embodiment.

An embodiment of the yoke vise is shown in FIGS. 1 and 2 generally at 20. Referring to FIG. 1, the vise 20 includes a right bracket 30, a left bracket 50, and a wrench 80. The term "wrench" as used herein is not limited to the stereotypical version of the adjustable wrench but is meant generally to include a tool for holding, twisting, or turning an object such as a bolt or nut.

In this embodiment, brackets 30 and 50 are fastened together by two fasteners, bolt 36 and connector knob 70. As seen in FIG. 3A, bolt 36 is held in place in right bracket bolt aperture 32 by right bracket inside nut 40 on right bracket inside wall 31 and right bracket lock nut 46 on right bracket outside wall 33. Bolt 36 slides into left bracket open-end slot 52. As bolt 36 is tightened, washer 38 presses against left bracket outside wall 53 and prevents bolt 36 from slipping.

Connector knob threads 72 fit through left bracket connector aperture 54 in left bracket outside wall 53 and screws into right bracket connector aperture 34, which is threaded. When turned, connector knob 70 handle presses against left bracket outside wall 53, thereby pulling brackets 30 and 50 together.

Right bracket protrusion aperture 44 and left bracket protrusion aperture 58 are both threaded to accept tension knob threads 62. Wrench 80 includes wrench arc slot 86 through which tension knob threads 62 pass, screwing into either right bracket protrusion aperture 44 or left bracket protrusion aperture 58. Tension knob 60 thus secures wrench 80 to right bracket top edge 35 and left bracket top edge 55.

The embodiment has at least two uses, to remove and replace a meter (not shown) and to remove and replace a shutoff valve 12. First, to detach slip nuts 16 from a meter (not shown), the user places left bracket 50 and right bracket 30 on either side of pipes 10. Bolt 36, which is already attached to right bracket 30, slides into left bracket open-end slot 52. Connector knob 70 passes through left bracket connector aperture 54 and screws into right bracket connector aperture. As connector knob 70 is tightened, thus pressing left bracket 50 and right bracket 30 against pipes 10, left bracket 50 and right bracket 30 are held upward so that they abut the underside of male adapter 11. If deemed necessary, bolt 36 is tightened as a second stabilizer of left bracket 50 and right bracket 30 against pipes 10. With left bracket 50 and right bracket 30 thus securing pipes 10, the embodiment acts as an effective "second yoke" that is closer to slip nuts 16 than permanent yoke 17, thereby allowing less torque and jostling of pipes 10 when slip nuts 16 are loosened or tightened to a meter (not shown).

Figure 5:
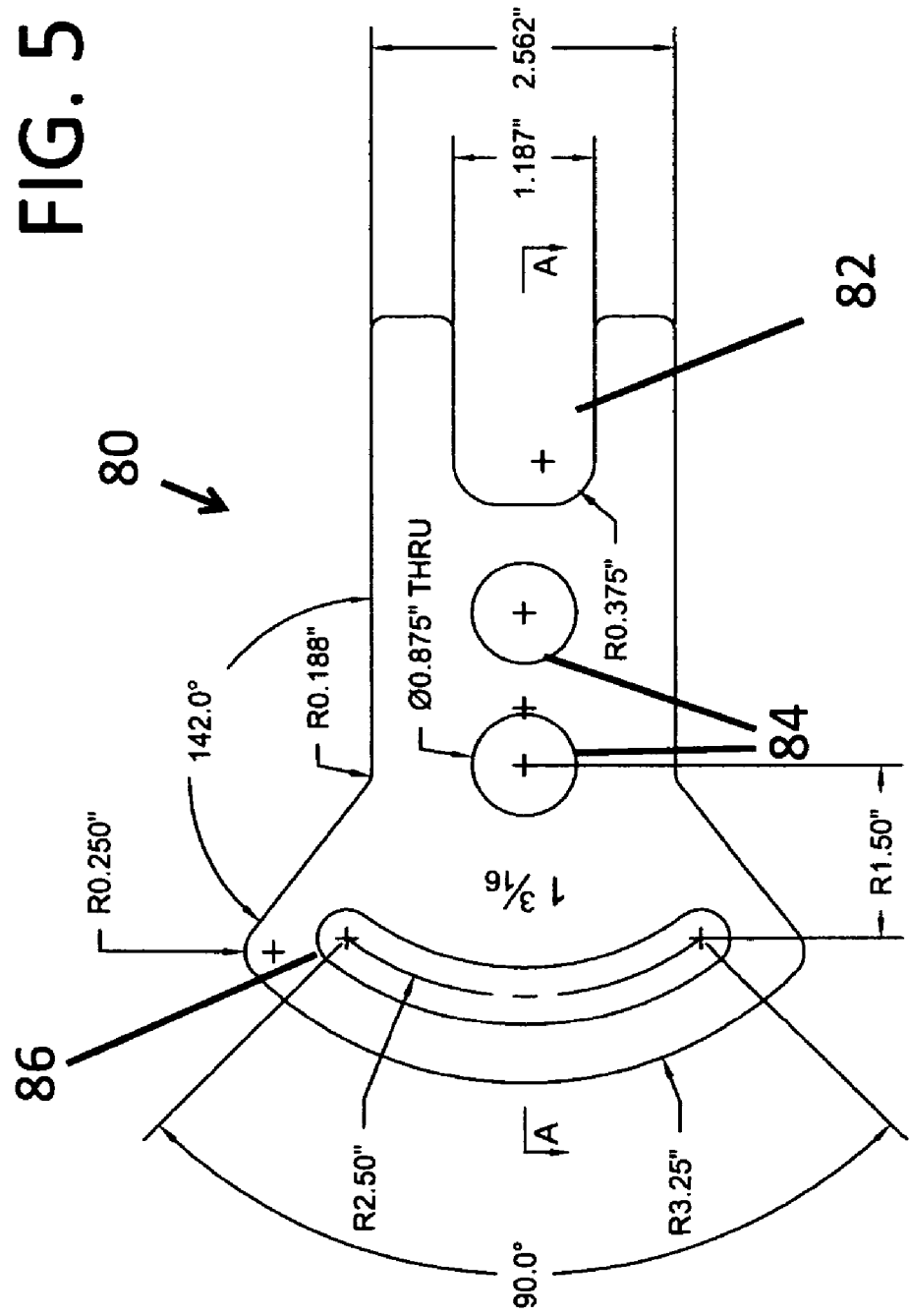
FIG. 5 is a top view of a variation of the wrench of the embodiment in FIGS. 1 and 2, with added finger holes.

To remove or replace the shutoff valve 12, (for example if ears 15 or shutoff handle 14 are damaged), left bracket 50 and right bracket 30 are in secured place as described above. Next, wrench open-end slot 82 is fitted around male adapter 11. Wrench 80 can be put in place by putting fingers through optional wrench finger holes 84, as seen in FIG. 5. Tension knob 60 is put through wrench arc slot 86 and screwed into either left bracket protrusion aperture 58 or right bracket protrusion aperture 44. Note that wrench arc slot 86 allows wrench 80 to be fastened at slightly different angles and therefore allow wrench open-end slot 82 to fit around male adapter 11 regardless of the nut angle of male adapter 11.

Once wrench 80 is securely fastened to right bracket top edge 35 and left bracket top edge 55, the user can loosen or tighten shutoff female nut 13 from now secured male adapter 11 and install or remove shutoff valve 12 without damage to pipes 10, permanent yoke 17, and surrounding plumbing.

Note that in this particular embodiment, wrench open-end slot 82 is meant to fit around a 1 3/16" male adapter 11. However, the wrench-open end slot 82 could also be constructed to fit around, for example, a 1 1/16" male adapter, or other common adapter sizes associated with piping or meters.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A yoke vise comprising:
    a wrench, including at least a first aperture wherein the diameter of said first aperture is the size of a male plumbing adapter and an eighth aperture wherein said eighth aperture is an arc-shaped slot;
    a first bracket having a first end and a second end, a second aperture, a third aperture, and a fourth aperture;
    a second bracket having a first end and a second end, a fifth aperture, a sixth aperture, and a seventh aperture;
    a first fastener for attaching said first end of said first bracket to at least to said first end of said second bracket through said second aperture and said fifth aperture, respectively;
    a second fastener for attaching said second end of said first bracket at least to said second end of said second bracket through said third aperture and said sixth aperture, respectively; and
    a third fastener for attaching said wrench at least to one of said first bracket and said second bracket, wherein said third fastener attaches said wrench to one of said first bracket and said second bracket through said eighth aperture and either said fourth aperture or said seventh aperture.

2. The yoke vise of claim 1, wherein said first aperture is an open-ended slot.

3. The yoke vise of claim 2, wherein said first aperture has a width of 1 and 1/16 inches.

4. The yoke vise of claim 2, wherein said first aperture has a width of 1 and 3/16 inches.

5. The yoke vise of claim 1, wherein said sixth aperture is an open-ended slot.

6. The yoke vise of claim 5, wherein said second fastener is at least a bolt whose diameter is equal or less than said sixth aperture.

7. The yoke vise of claim 6, wherein said second fastener further comprises a washer, a threaded nut and a threaded lock nut.

8. The yoke vise of claim 1, wherein the face of said fourth aperture is parallel with the plane of the top edge of said first bracket, and the face of said seventh aperture is parallel with the plane of the top edge of said second bracket.

9. The yoke vise of claim 8, wherein said first bracket includes a first protrusion with a face parallel to the top edge of said first bracket, wherein said second bracket includes a second protrusion with a face parallel to the top edge of said second bracket, wherein said fourth aperture is located in said first protrusion, and wherein said seventh aperture is located in said second protrusion.

10. The yoke vise of claim 1, wherein said fourth aperture and said seventh aperture are threaded, and said third fastener is a tension knob.

11. The yoke vise of claim 1, wherein said third fastener attaches said wrench to one of the top side of said first bracket and the top side of said second bracket.

12. The yoke vise of claim 1, wherein said wrench further comprises a ninth aperture and a tenth aperture, said ninth and tenth apertures having diameters of a human finger.

13. The yoke vise of claim 1, wherein said first fastener is a tension knob.

* * * * *